(12) United States Patent
Deng et al.

(10) Patent No.: US 10,562,644 B2
(45) Date of Patent: Feb. 18, 2020

(54) SYSTEM AND METHOD FOR AIRCRAFT DOCKING GUIDANCE AND AIRCRAFT TYPE IDENTIFICATION

(71) Applicants: SHENZHEN CIMC-TIANDA AIRPORT SUPPORT LTD., Guangdong (CN); CHINA INTERNATIONAL MARINE CONTAINERS (GROUP) LTD., Guangdong (CN)

(72) Inventors: Lan Deng, Shenzhen (CN); Zhaohong Zhang, Shenzhen (CN); Shaomin Chang, Shenzhen (CN); Wei Xiang, Shenzhen (CN); Haibin Wang, Shenzhen (CN); Haiqiu Liu, Shenzhen (CN)

(73) Assignees: SHENZHEN CIMC-TIANDA AIRPORT SUPPORT LTD., Guangdong (CN); CHINA INTERNATIONAL MARINE CONTAINERS (GROUP) LTD., Guangdong (CN)

( * ) Notice: Subject to any disclaimer, the term of this patent is extended or adjusted under 35 U.S.C. 154(b) by 518 days.

(21) Appl. No.: 15/329,979

(22) PCT Filed: Jul. 2, 2015

(86) PCT No.: PCT/CN2015/083204
§ 371 (c)(1),
(2) Date: Jan. 27, 2017

(87) PCT Pub. No.: WO2016/015545
PCT Pub. Date: Feb. 4, 2016

(65) Prior Publication Data
US 2017/0259939 A1    Sep. 14, 2017

(30) Foreign Application Priority Data

Aug. 1, 2014    (CN) .......................... 2014 1 0377385

(51) Int. Cl.
*G01C 3/08*    (2006.01)
*B64F 1/00*    (2006.01)
(Continued)

(52) U.S. Cl.
CPC .............. *B64F 1/002* (2013.01); *G01S 7/497* (2013.01); *G01S 17/06* (2013.01); *G01S 17/42* (2013.01);
(Continued)

(58) Field of Classification Search
CPC .......... B64F 1/002; G01S 17/06; G01S 17/42; G01S 17/936; G01S 17/66; G01S 7/497; G08G 5/065; G08G 5/0026
(Continued)

(56) References Cited

U.S. PATENT DOCUMENTS

| 4,995,102 A | 2/1991 | Ichinose et al. |
| 5,334,848 A | 8/1994 | Grimm |

(Continued)

FOREIGN PATENT DOCUMENTS

| CN | 1167538 A | 12/1997 |
| CN | 1198716 A | 11/1998 |

(Continued)

OTHER PUBLICATIONS

Supplementary European Search Report dated Nov. 10, 2017.

*Primary Examiner* — Mark Hellner
(74) *Attorney, Agent, or Firm* — Amster, Rothstein & Ebenstein LLP

(57) ABSTRACT

A laser scanning-based aircraft docking guidance system and method, the method comprising: a capturing step: laser
(Continued)

scanning in the horizontal direction is performed on a position where the head of an aircraft is expected to appear, echo data based on the laser scanning is obtained, and the echo data is judged according to a judging condition, so as to determine whether the aircraft has appeared; a guiding step: after the aircraft has appeared, laser scanning in the horizontal direction is performed on the head of the aircraft, echo data based on the laser scanning is obtained, and the position of the nose of the aircraft is determined; a tracking step: as the aircraft moves forward, the position of the nose is tracked by adjusting the vertical scanning angle of the laser scanning, and the position of the nose is displayed in real time.

14 Claims, 8 Drawing Sheets

(51) Int. Cl.
| | |
|---|---|
| G01S 17/42 | (2006.01) |
| G08G 5/00 | (2006.01) |
| G08G 5/06 | (2006.01) |
| G01S 17/66 | (2006.01) |
| G01S 7/497 | (2006.01) |
| G01S 17/93 | (2020.01) |
| G01S 17/06 | (2006.01) |

(52) U.S. Cl.
CPC ............ *G01S 17/66* (2013.01); *G01S 17/936* (2013.01); *G08G 5/0026* (2013.01); *G08G 5/065* (2013.01)

(58) Field of Classification Search
USPC ........................................................ 356/5.01
See application file for complete search history.

(56) References Cited

U.S. PATENT DOCUMENTS

| | | | |
|---|---|---|---|
| 5,675,661 A | | 10/1997 | Richman et al. |
| 6,023,665 A | * | 2/2000 | Millgard ................ B64F 1/002 |
| | | | 702/151 |
| 6,324,489 B1 | * | 11/2001 | Millgård ................ B64F 1/305 |
| | | | 340/958 |
| 6,658,329 B1 | | 12/2003 | Howard et al. |
| 6,704,098 B2 | * | 3/2004 | Anderberg ............. B64F 1/002 |
| | | | 356/139.04 |
| 6,910,660 B2 | | 6/2005 | LeCroy, Jr. |
| 7,481,537 B2 | | 1/2009 | Meadows |
| 2015/0142218 A1 | * | 5/2015 | Lin ........................ B64D 43/00 |
| | | | 701/3 |

FOREIGN PATENT DOCUMENTS

| | | |
|---|---|---|
| CN | 1399767 A | 2/2003 |
| CN | 103 786 893 A | 5/2014 |
| CN | 103786893 A | 5/2014 |
| CN | 203601576 U | 5/2014 |
| DE | 4301637 A1 | 8/1994 |
| JP | 02 216393 A | 8/1990 |
| JP | 02216393 A | 8/1990 |
| WO | 01/35327 A1 | 5/2001 |
| WO | 02/056054 A2 | 7/2002 |
| WO | 2013/141605 A1 | 9/2013 |

* cited by examiner

SYSTEM AND METHOD FOR AIRCRAFT DOCKING GUIDANCE AND AIRCRAFT TYPE IDENTIFICATION

CROSS-REFERENCE TO RELATED APPLICATIONS

The present application is based upon and claims priority to Chinese Patent Application No. 201410377385.3, filed Aug. 1, 2014, the entire contents of which are incorporated herein by reference.

TECHNICAL FIELD

The present disclosure generally relates to a docking guidance system for capturing, tracking and identifying aircrafts, and more particularly, to a laser scanning-based aircraft docking guidance and aircraft type identification system and method.

BACKGROUND

Aircraft docking guidance refers to a process of guiding an arriving aircraft from a gate position to a designated exact stop position. The aim of the docking guidance is to ensure safe and accurate docking of the arriving aircraft, to facilitate accurate cooperation of the aircraft with various ground interfaces (ground crews), and to make the passenger boarding bridge (PBB) accurately connected to the aircraft door and thereby improve the efficiency and safety of the airport.

Automated aircraft docking guidance systems may be divided into the following categories depending on the types of the employed sensors:

(1) buried loop coils category; (2) laser scanning and ranging category; (3) visual perception category.

The automated guidance systems using buried loop coils detect whether there is a metal object passing or stopping to determine the position of an arriving aircraft. The systems using the buried loop coils have advantages such as fast response speed, low costs and no requirements on weather and illumination, but these systems are not accurate and have low anti-interference capability. Also, leads and electronic elements buried in the ground can be broken easily and have low reliability, and such elements have low measurement accuracy, cannot identify aircraft types, and are less debuggable and maintainable.

The laser scanning-based docking guidance systems determine real time positions, speeds and types of aircrafts by laser scanning and ranging. Such laser is safe to eyes, and less influenced by environment and climate, has a location accuracy up to millimeter orders, and is easy to maintain. Thus, the laser scanning-based docking guidance systems are completely capable of handling increasingly heavy reception tasks at airports.

SUMMARY

The technical problem to be solved by the present disclosure is to provide a laser scanning-based aircraft docking guidance system and method, which are capable of capturing, guiding and tracking aircrafts, obtaining real time positions of aircrafts by accuracy laser scanning and providing docking guidance to pilots.

Further, the present disclosure can automatically identify types of aircrafts and thereby increase safety for aircraft docking.

Embodiments of the present disclosure provide a laser scanning-based aircraft docking guidance method, including:

in a capture step, conducting laser scanning to horizontally scan a position where an aircraft head of an aircraft is expected to appear, obtaining pieces of echo data based on the laser scanning, and according to a judgment condition, determining whether the aircraft appears based on the echo data;

in a guidance step, after the aircraft appears, conducting the laser scanning to horizontally scan the aircraft head, obtaining the echo data based on the laser scanning, and determining a position of an aircraft nose of the aircraft according to the echo data; and in a tracking step, while the aircraft is traveling, tracking the position of the aircraft nose by adjusting a vertical scanning angle of the laser scanning, and displaying the position of the aircraft nose in real time.

According to an embodiment, prior to the capture step, the method further includes a zero point calibration step which includes a device mounting zero point calibration step performed when a laser scanning system is first installed, wherein the device mounting zero point calibration step includes:

a horizontal zero point measurement step which includes:

horizontally scanning, by the laser scanning system, a calibration area on the ground with a vertical scanning angle fixed, wherein the calibration area is divided equally into N small regions; measuring distances from a boundary point of each of the small regions, and finding a minimum value among the obtained distance values; determining an extended area with a boundary point corresponding to the minimum value as a center; and identifying a position of a horizontal reflection mirror corresponding to a minimum distance value as a horizontal zero point; and a vertical zero point measurement step which includes:

conducting distance measurement at a vertical scanning angle $\beta_1$ by the laser scanning system to obtain a first distance value $L_1$, conducting the distance measurement again by adjusting the vertical scanning angle $\beta_1$ upwards by an angle $\lambda$ to obtain a second distance value $L_2$, and calculating $\beta_1$ using the following equation:

$$L_1 * \sin \beta_1 = L_2 * \sin(\beta_1 - \lambda)$$

wherein a position of a vertical reflection mirror when the vertical reflection mirror is rotated upwards by an angle $(\beta_1 - \lambda)$ with respect to a current position of the vertical reflection mirror is identified as a vertical zero point.

According to an embodiment, the zero point calibration step further includes a zero point correction step which includes:

after the device mounting zero point calibration step is finished, adjusting a scanning angle of the laser scanning system from a zero point step by step until a preset reference object is found, and recording a scanning angle at this time as a correction angle; and when the laser scanning system is restarted, adjusting the scanning angle backwards by the correction angle to find a zero point after the preset reference object is found by the laser scanning system.

A guidance line setting step may include the following steps.

A calibration object is set up at two positions on the guidance line. The calibration object may be a person or a calibration board which is bigger than a person. One of the two positions is an intersection point (i.e., a stopping point) of the guidance line and a stopping line, and the other is a father position on the straight guidance line, which can be as far as possible, for example, 100 meters away. The calibration objects at the two positions are horizontally scanned for many times, and the points obtained by the scanning are converted into x-y-z three dimensional coordinates. Points, z coordinates of which are within a certain range, are extracted as the points obtained by the scanning of the calibration objects. The range is preferably from 0.5 meter to 1.5 meters. For the two positions, average coordinates of points obtained by scanning of the calibration objects are calculated so as to obtain the x-y coordinates of the two positions. A straight line passing the two positions is constructed to obtain an equation of the guidance line $y=k_g x+b_g$. Another straight line perpendicular to the guidance line and passing through the first position (i.e., the stopping point position) is constructed to obtain an equation of the stopping line $y=k_s x+b_s$. For the guidance lines corresponding to the stopping lines, different values of $b_s$ are set and the equation is recorded so that a plurality of stopping point positions and stopping line equations can be obtained.

The judgment condition in the capture step further includes:

A: determining whether a ratio of the number of points of interest, which are continuous and one of which corresponds to a minimum distance value, to the total number of the pieces of echo data is greater than a threshold;

B: calculating an aircraft width based on the total number of the pieces of echo data, and determining whether the aircraft width is not less than a width threshold; and C: calculating an aircraft height and determining whether the calculated aircraft height is within a predetermined range;

wherein the distance values of the points of interest are within a specified prediction range.

According to an embodiment, in the capture step, when the echo data is obtained, median filtering is performed on the echo data and then whether the aircraft appears is determined.

According to an embodiment, the guidance step further includes:

extracting from the echo data target points falling on the aircraft head, and converting the target points from polar coordinate data into three-dimensional spatial data;

identifying from the target points a point having a minimum Y-direction value as a closest point;

conducting curve fitting to fit the target points to a curve and identify a vertex of the curve; and determining one of the closest point and the vertex as the position of the aircraft nose according to a difference between an X-value of the closest point and an X-value of the vertex.

According to an embodiment, the tracking step further includes:

scanning the position of the aircraft nose at a predetermined vertical scanning angle while the aircraft is travelling;

calculating a current aircraft nose point according to the echo data; and vertically scanning the current aircraft nose point, and calculating a variation amount of the vertical scanning angle according to a vertex of a obtained parabola according to the scanning, and changing the vertical scanning angle according to the variation amount, or calculating a variation amount of the vertical scanning angle according to the current aircraft nose point and changing the vertical scanning angle according to the variation amount.

According to an embodiment, the method further includes an aircraft type identification step;

wherein the aircraft type identification step includes one or more of aircraft nose height verification, aircraft cabin width verification, verification of a head aerial view profile, verification of a head side view profile and aircraft engine verification;

the aircraft nose height verification includes: if a difference between the aircraft nose height and a preset aircraft nose height is within a preset range, determining that the aircraft nose height verification is passed;

the aircraft cabin width verification includes: finding two points from the echo data, a difference between X coordinates of which is the maximum, with a straight line distance between the two points as an aircraft cabin width, if the aircraft cabin width is greater than a product of a theoretic aircraft cabin width and a width coefficient, determining that the aircraft cabin width verification is passed;

the verification of the head aerial view profile includes: bringing the echo data $(x_i,y_i,z_i)$ obtained by horizontal laser scanning into a preset aerial view profile equation $y=f^n(x)$, calculating a horizontal fit point error $\Delta d_i^h=|f^n(x_i)-y_i|$, identifying a maximum horizontal fit error $D_H=\max(\Delta d_i^h)$, and if $D_H<\Delta D_H$, determining that the verification of the head aerial view profile is passed, wherein $\Delta D_H$ is a threshold for the verification of the head aerial view profile, i is the serial number of individual one of target points in the echo data, and n is the number of fittings of the aerial view profile equation;

the verification of the head side view profile includes: bringing the echo data $(x_i,y_i,z_i)$ obtained by vertical laser scanning into a preset side view profile equation $z=g^m(y)$, calculating a vertical fit point error $\Delta d_j^v=|g^m(y_i)-z_i|$, identifying a maximum vertical fit error $D_v=\max(\Delta d_j^v)$, and if $D_V<\Delta D_V$, determining that the verification of the head side view profile is passed, wherein $\Delta D_V$ is a threshold for the verification of the head side view profile, i is the serial number of individual one of target points in the echo data, and m is the number of fittings of the side view profile equation;

the aircraft engine verification includes:

calculating positions of engines according to the position of the aircraft nose, and conducting laser scanning to horizontally and vertically scan the positions of the engines;

converting the echo data obtained by the horizontal scanning into x-y-z three dimensional coordinates, finding a closest coordinate point which is closest to a theoretic engine center, and finding points contiguous to the closest coordinate point to obtain a point set, and calculating a distance between a leftmost point and a rightmost point in the point set as an engine width and a middle point between the leftmost point and the rightmost point as a horizontal coordinate of an engine center;

converting the echo data obtained by the vertical scanning into x-y-z three dimensional coordinates, finding a closest coordinate point which is closest to the theoretic engine center, and finding points contiguous to the closest coordinate point to obtain a point set, and calculating a distance between a uppermost point and a lowermost point in the point set as an engine height, and a middle point between the uppermost point and the lowermost point as a height of the engine center from ground;

determining whether the number of the engines is consistent with a preset number, and if the number of the engines is not consistent with the preset number, determining that the aircraft engine verification is not passed;

determining whether a difference between the horizontal coordinate of the engine center and a standard value exceeds a threshold or whether a difference between the height of the engine center from ground and a standard value exceeds a threshold, and if the difference between the horizontal coordinate of the engine center and a standard value exceeds a threshold or the difference between the height of the engine center from ground and a standard value exceeds a threshold, determining that the aircraft engine verification is not passed;

determining whether a difference between the engine width and a standard value exceeds a threshold, or whether a difference between the engine height and a standard value exceeds a threshold, and if the difference between the engine width and a standard value exceeds a threshold, or the difference between the engine height and a standard value exceeds a threshold, determining that the aircraft engine verification is not passed.

Embodiments of the present disclosure further provide a laser scanning-based aircraft docking guidance system, including:

a capture unit configured to conduct laser scanning to horizontally scan a position where an aircraft head of an aircraft is expected to appear, obtain pieces of echo data based on the laser scanning, and according to a judgment condition, determine whether the aircraft appears based on the echo data;

a guidance unit configured to, after the aircraft appears, conduct the laser scanning to horizontally scan the aircraft head, obtain echo data based on the laser scanning, and determine a position of an aircraft nose of the aircraft according to the echo data; and a tracking unit configured to, while the aircraft is traveling, track the position of the aircraft nose by adjusting a vertical scanning angle of the laser scanning, and display the position of the aircraft nose in real time.

According to an embodiment, the system further includes a zero point calibration unit which includes a device mounting zero point calibration unit;

wherein the device mounting zero point calibration unit includes:

a horizontal zero point measurement unit includes a unit configured to:

horizontally scan, by the laser scanning system, a calibration area on the ground with a vertical scanning angle fixed, wherein the calibration area is divided equally into N small regions; measure distances from a boundary point of each of the small regions, and find a minimum value among the obtained distance values; determine an extended area with a boundary point corresponding to the minimum value as a center; and identify a position of a horizontal reflection mirror corresponding to a minimum distance value as a horizontal zero point; and a vertical zero point measurement unit includes a unit configured to:

conduct distance measurement at a vertical scanning angle $\beta_1$ by the laser scanning system to obtain a first distance value $L_1$, conduct the distance measurement again by adjusting the vertical scanning angle $\beta_1$ upwards by an angle $\lambda$ to obtain a second distance value $L_2$, and calculate $\beta_1$ using the following equation:

$$L_1 * \sin \beta_1 = L_2 * \sin(\beta_1 - \lambda)$$

wherein a position of a vertical reflection mirror when the vertical reflection mirror is rotated upwards by an angle $(\beta_1 - \lambda)$ with respect to a current position of the vertical reflection mirror is identified as a vertical zero point.

According to an embodiment, the zero point calibration unit further includes a zero point correction unit which comprises a unit configured to:

adjust a scanning angle of the laser scanning system from a zero point step by step until a preset reference object is found, and record a scanning angle at this time as a correction angle; and when the laser scanning system is restarted, adjust the scanning angle backwards by the correction angle to find a zero point after the preset reference object is found by the laser scanning system.

The system may further include a guidance line setting unit which can be configured to perform the following steps.

A calibration object is set up at two positions on the guidance line. The calibration object may be a person or a calibration board which is bigger than a person. One of the two positions is an intersection point (i.e., a stopping point) of the guidance line and a stopping line, and the other is a father position on the straight guidance line, which can be as far as possible, for example, 100 meters away. The calibration objects at the two positions are horizontally scanned for many times, and the points obtained by the scanning are converted into x-y-z three dimensional coordinates. Points, z coordinates of which are within a certain range, are extracted as the points obtained by the scanning of the calibration objects. The range is preferably from 0.5 meter to 1.5 meters. For the two positions, average coordinates of points obtained by scanning of the calibration objects are calculated so as to obtain the x-y coordinates of the two positions. A straight line passing the two positions is constructed to obtain an equation of the guidance line $y=k_g x+b_g$. Another straight line perpendicular to the guidance line and passing through the first position (i.e., the stopping point position) is constructed to obtain an equation of the stopping line $y=k_s x+b_s$. For the guidance lines corresponding to the stopping lines, different values of $b_s$ are set and the equation is recorded so that a plurality of stopping point positions and stopping line equations can be obtained.

According to an embodiment, the judgment condition in the capture unit further includes:

A: determining whether a ratio of the number of points of interest, which are continuous and one of which corresponds to a minimum distance value, to the total number of the pieces of echo data is greater than a threshold;

B: calculating an aircraft width based on the total number of the pieces of echo data, and determining whether the aircraft width is not less than a width threshold; and C: calculating an aircraft height and determining whether the calculated aircraft height is within a predetermined range;

wherein the distance values of the points of interest are within a specified prediction range.

According to an embodiment, the capture unit includes a unit configured to, when the echo data is obtained, perform median filtering on the echo data and then determine whether the aircraft appears.

According to an embodiment, the guidance unit further includes:

a unit configured to extract from the echo data target points falling on the aircraft head, and convert the target points from polar coordinate data into three-dimensional spatial data;

a unit configured to identify from the target points a point having a minimum Y-direction value as a closest point;

a unit configured to conduct curve fitting to fit the target points to a curve and identify a vertex of the curve; and a unit configured to determine one of the closest point and the vertex as the position of the aircraft nose according to a difference between an X-value of the closest point and an X-value of the vertex.

According to an embodiment, the tracking unit further includes:

a unit configured to scan the position of the aircraft nose at a predetermined vertical scanning angle while the aircraft is travelling;

a unit configured to calculate a current aircraft nose point according to the echo data; and a unit configured to vertically scan the current aircraft nose point, and calculate a variation amount of the vertical scanning angle according to a vertex of a obtained parabola according to the scanning, and change the vertical scanning angle according to the variation amount, or calculate a variation amount of the vertical scanning angle according to the current aircraft nose point and change the vertical scanning angle according to the variation amount.

According to an embodiment, the system further includes an aircraft type identification unit;

the aircraft type identification unit includes one or more of an aircraft nose height verification unit, an aircraft cabin width verification unit, a head aerial view profile verification unit, a head side view profile verification unit and an aircraft engine verification unit;

the aircraft nose height verification unit includes a unit configured to: if a difference between the aircraft nose height and a preset aircraft nose height is within a preset range, determine that the aircraft nose height verification is passed;

the aircraft cabin width verification unit includes a unit configured to: find two points from the echo data, a difference between X coordinates of which is the maximum, with a straight line distance between the two points as an aircraft cabin width, if the aircraft cabin width is greater than a product of a theoretic aircraft cabin width and a width coefficient, determine that the aircraft cabin width verification is passed;

the head aerial view profile verification unit includes a unit configured to: bring the echo data $(x_i, y_i, z_i)$ obtained by horizontal laser scanning into a preset aerial view profile equation $y=f^n(x)$, calculate a horizontal fit point error $\Delta d_i^h = |f^n(x_i) - y_i|$, identify a maximum horizontal fit error $D_H = \max(\Delta d_i^h)$, and if $D_H < \Delta D_H$, determine that the verification of the head aerial view profile is passed, wherein $\Delta D_H$ is a threshold for the verification of the head aerial view profile, i is the serial number of individual one of target points in the echo data, and n is the number of fittings of the aerial view profile equation;

head side view profile verification unit includes a unit configured to: bring the echo data) obtained by vertical laser scanning into a preset side view profile equation $z=g^m(y)$, calculate a vertical fit point error $\Delta d_j^v = |g^m(y_j) - z_j|$, identify a maximum vertical fit error $D_v = \max(\Delta d_j^v)$, and if $D_v < \Delta D_v$, determine that the verification of the head side view profile is passed, wherein $\Delta D_v$ is a threshold for the verification of the head side view profile, i is the serial number of individual one of target points in the echo data, and m is the number of fittings of the side view profile equation;

aircraft engine verification unit includes:

a unit configured to calculate positions of engines according to the position of the aircraft nose, and conduct laser scanning to horizontally and vertically scan the positions of the engines;

a unit configured to convert the echo data obtained by the horizontal scanning into x-y-z three dimensional coordinates, find a closest coordinate point which is closest to a theoretic engine center, and find points contiguous to the closest coordinate point to obtain a point set, and calculate a distance between a leftmost point and a rightmost point in the point set as an engine width and a middle point between the leftmost point and the rightmost point as a horizontal coordinate of an engine center;

a unit configured to convert the echo data obtained by the vertical scanning into x-y-z three dimensional coordinates, find a closest coordinate point which is closest to the theoretic engine center, and find points contiguous to the closest coordinate point to obtain a point set, and calculate a distance between a uppermost point and a lowermost point in the point set as an engine height, and a middle point between the uppermost point and the lowermost point as a height of the engine center from ground;

a unit configured to determine whether the number of the engines is consistent with a preset number, and if the number of the engines is not consistent with the preset number, determine that the aircraft engine verification is not passed;

a unit configured to determine whether a difference between the horizontal coordinate of the engine center and a standard value exceeds a threshold or whether a difference between the height of the engine center from ground and a standard value exceeds a threshold, and if the difference between the horizontal coordinate of the engine center and a standard value exceeds a threshold or the difference between the height of the engine center from ground and a standard value exceeds a threshold, determine that the aircraft engine verification is not passed;

a unit configured to determine whether a difference between the engine width and a standard value exceeds a threshold, or whether a difference between the engine height and a standard value exceeds a threshold, and if the difference between the engine width and a standard value exceeds a threshold, or the difference between the engine height and a standard value exceeds a threshold, determine that the aircraft engine verification is not passed.

The technical solutions provided by embodiments of the present disclosure can capture, guide and track aircrafts, obtain real time positions of the aircrafts by accuracy laser scanning and display the positions so as to provide docking guidance to pilots. Further, technical solutions of the present disclosure can automatically identify types of the aircrafts and thereby increase safety for aircraft docking.

DETAILED DESCRIPTION

Embodiments of the present disclosure provide a laser scanning-based aircraft docking guidance system and method, which are capable of capturing, guiding and tracking aircrafts to provide assistance in aircraft docking, accurately obtaining positions of the aircrafts in real time and providing guidance information to pilots. Also, the technical solutions in the present disclosure can identify types of the aircrafts.

An aircraft may go through a long distance from entering into a gate to finally stopping, and thus the procedure of aircraft docking can be divided into a plurality of phases, and different contents need to be monitored during different phases. That is to say, the field for aircraft docking needs to be defined in advance.

Figure 1:
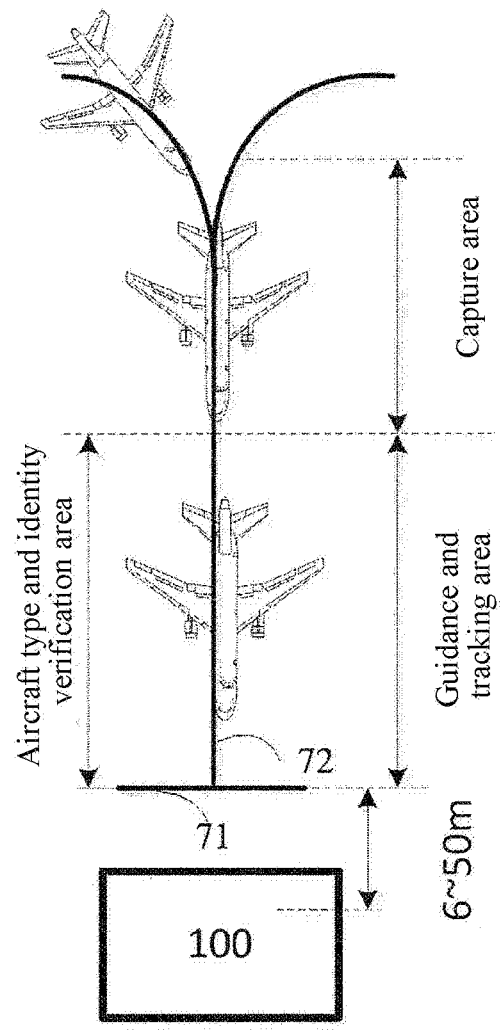
FIG. 1 is a schematic diagram illustratively showing how a field is divided for a laser scanning-based aircraft docking guidance system.

The defining of aircraft docking field refers to dividing the monitoring field into different information process function areas on a computer by field measurement and analysis. As shown in FIG. 1, the path which an aircraft goes through till a stopping line may include in turn a capture area, a type and identity verification area, and a guidance and tracking area, so that corresponding guidance procedures can be performed in respective areas. The type and identity verification and the guidance and tracking area can correspond to the same section of area.

The guidance and tracking area is from a stopping line 71 to a position of the nose of an aircraft when the head of the aircraft enters into the gate and is straightened for the first time. The aircraft goes forward along a guidance line 72.

Because aircrafts usually have a symmetrical shape, the present disclosure takes the nose of an aircraft in an axis of symmetry of the aircraft as a reference point for determining the position of the whole aircraft, and a coordinate system is established using the guidance line and the stopping line.

Figure 2:
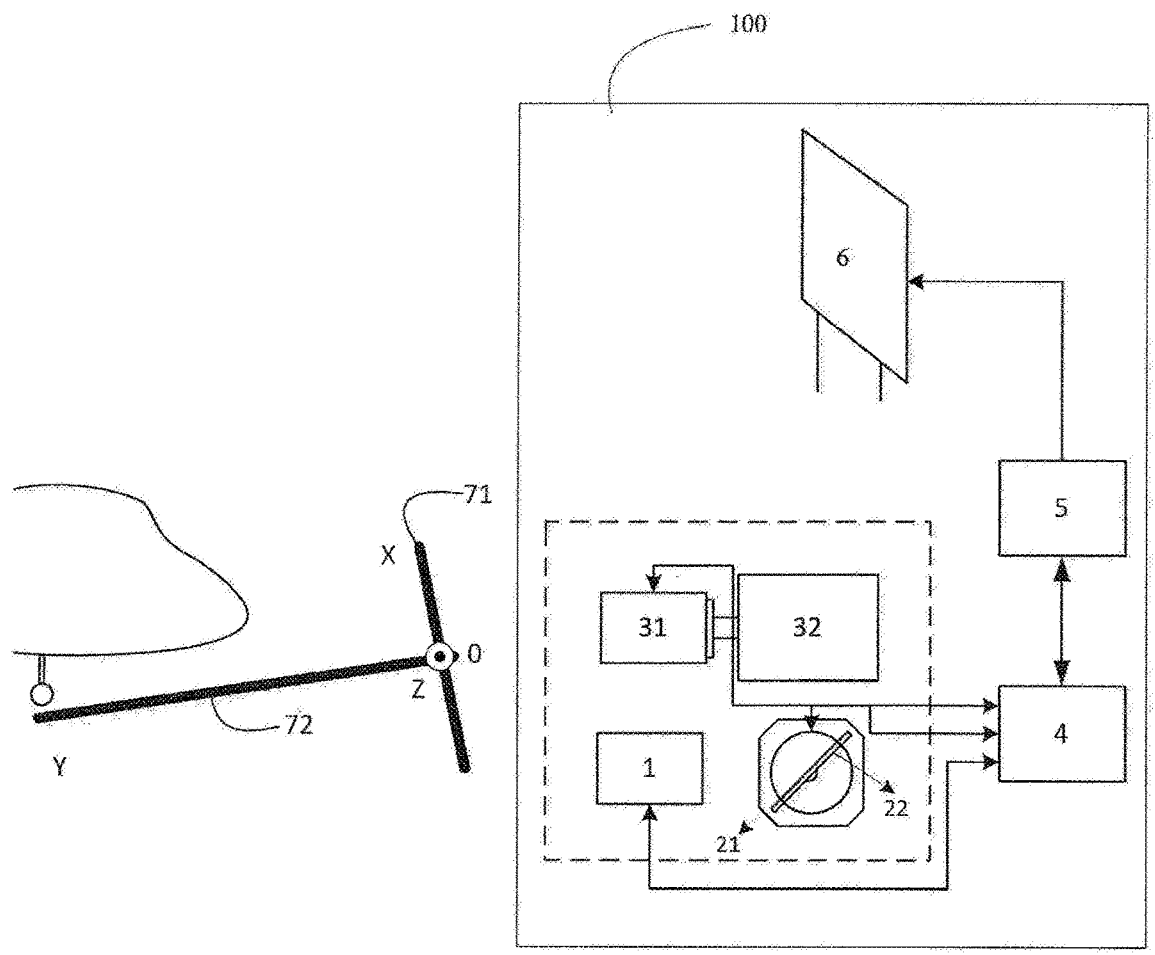
FIG. 2 is a block diagram illustratively showing a structure of a laser scanning-based aircraft docking guidance system.

The coordinate system established in the present disclosure is shown in FIG. 2. An intersection point of the guidance line 72 and the stopping line 71 is used as a zero point. A direction perpendicular to the guidance line 72 and in parallel with the ground is an X-axis direction, and the positive direction of the X-axis is the left hand direction with respect to the aircraft docking direction. A direction in parallel with the ground and the stopping line 71 is a Y-axis direction, and the positive direction of the Y-axis is opposite to the aircraft docking direction. A direction perpendicular to the ground and the guidance line is a Z-axis direction, and the positive direction of the Z-axis is perpendicular to the ground and pointing upwards.

The present disclosure discloses a laser scanning-based aircraft docking guidance system 100, which is disposed at a position outside the guidance and tracking area, directly facing the head of an approaching aircraft on the extension line of the guidance line 72. FIG. 2 is a block diagram illustratively showing a structure of the laser scanning-based aircraft docking guidance system 100.

The laser scanning-based aircraft docking guidance system 100 includes a laser ranging device 1, a horizontal laser scanning device 2, a vertical laser scanning device 3, a scanning control device 4, an information process unit 5 and an information display unit 6.

The laser ranging device 1, the horizontal laser scanning device 2, the vertical laser scanning device 3, and the information process unit 5 are connected with the scanning control device 4, and the information process unit 5 is further connected with the information display unit 6.

The laser ranging device 1 in the present disclosure emits laser and receives laser reflected by a measured object, and meanwhile measures a distance between a laser emitting point and a measured target to obtain a distance value. The laser scanning devices employ a dual galvanometer structure (including horizontal and vertical directions). Specifically, the horizontal laser scanning device 2 includes a horizontal scanning stepper motor 21 and a horizontal reflection mirror 22, and the vertical laser scanning device 3 includes a vertical scanning stepper motor 31 and a vertical reflection mirror 32. During the scanning procedure, according to a rotation angle α of the horizontal scanning stepper motor 21, a rotation angle β of the vertical scanning stepper motor 31 and laser ranging data 1 obtained by the laser ranging device 1, polar coordinates of a certain point in space can be obtained.

The horizontal laser scanning in the present disclosure refers to that the horizontal scanning stepper motor 21 is rotated by an angle α to drive the horizontal reflection mirror 22 to be rotated by an angle α, so that the laser ranging device 1 can perform ranging in the horizontal direction. Under such condition, the vertical scanning stepper motor 31 is not rotated and only the horizontal scanning stepper motor 21 is rotated, and meanwhile the laser ranging device 1 continuously performs ranging to obtain a set of ranging data in the horizontal direction, and then a horizontal laser scan is finished.

The vertical laser scanning in the present disclosure refers to that the vertical scanning stepper motor 31 is rotated by an angle β to drive the vertical reflection mirror 32 to be rotated by an angle β, so that the laser ranging device 1 can perform ranging in the vertical direction. Under such condition, the horizontal scanning stepper motor 21 is not rotated and only the vertical scanning stepper motor 31 is rotated, and meanwhile the laser ranging device 1 continuously performs ranging to obtain a set of ranging data in the vertical direction, and then a vertical laser scan is finished.

The laser ranging device 1, the horizontal laser scanning device 2 and the vertical laser scanning device 3 constitute a laser scanning system in the system 100.

The scanning control device 4 accepts commands from the information process unit 5 to configure and send control commands to the laser scanning system, and transmits the aircraft docking related data which is sampled by the laser scanning system to the information processing unit 5. The information process unit 5 processes the data, and displays the processed information on the information display unit 6, so that pilots can adjust the traveling direction of an aircraft according to the position of the aircraft displayed on the information display unit 6.

In order to reflect the position information of an aircraft to be docked in real time, the laser scanning system and the information process unit 5 are fast and accurate.

Figure 3:
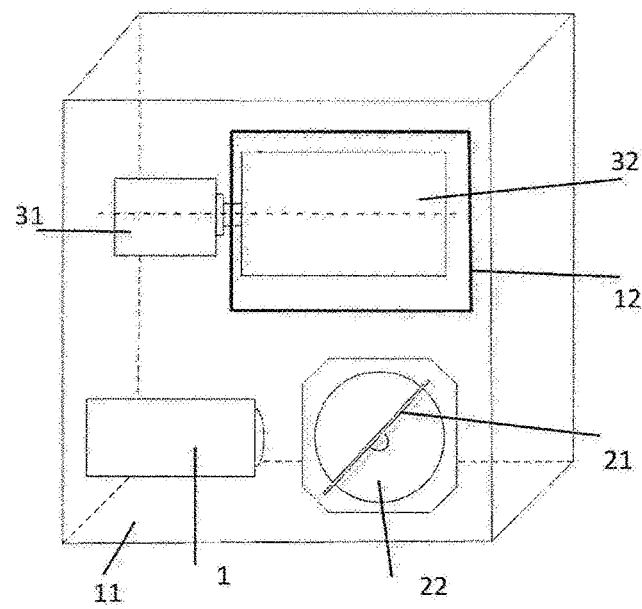
FIG. 3 is a block diagram illustratively showing a structure of a laser scanning system.

FIG. 3 is a block diagram illustratively showing a structure of the laser scanning system. Corresponding to FIG. 2, a housing 11 of the laser scanning system accommodates at least the laser ranging device 1, the horizontal laser scanning device 2 and the vertical laser scanning device 3. The housing 11 of the laser scanning system is provided with a laser emitting window 12, through which the laser from the horizontal laser scanning device 2 and the vertical laser scanning device 3 is emitted to scan an object to be guided. The laser emitting window 12 has a fixed position relative to the horizontal laser scanning device 2 and the vertical laser scanning device 3.

When the laser scanning-based aircraft docking guidance system 100 is mounted for the first time, a device mounting zero point calibration step needs to be performed so as to calibrate the zero point of the laser scanning system. Especially, the horizontal zero point position for the horizontal laser emitting direction of the horizontal laser scanning device 2 and the vertical zero point position for the vertical laser emitting direction of the vertical laser scanning device 3 need to be determined.

Horizontal Zero Point Calibration

Figure 4:
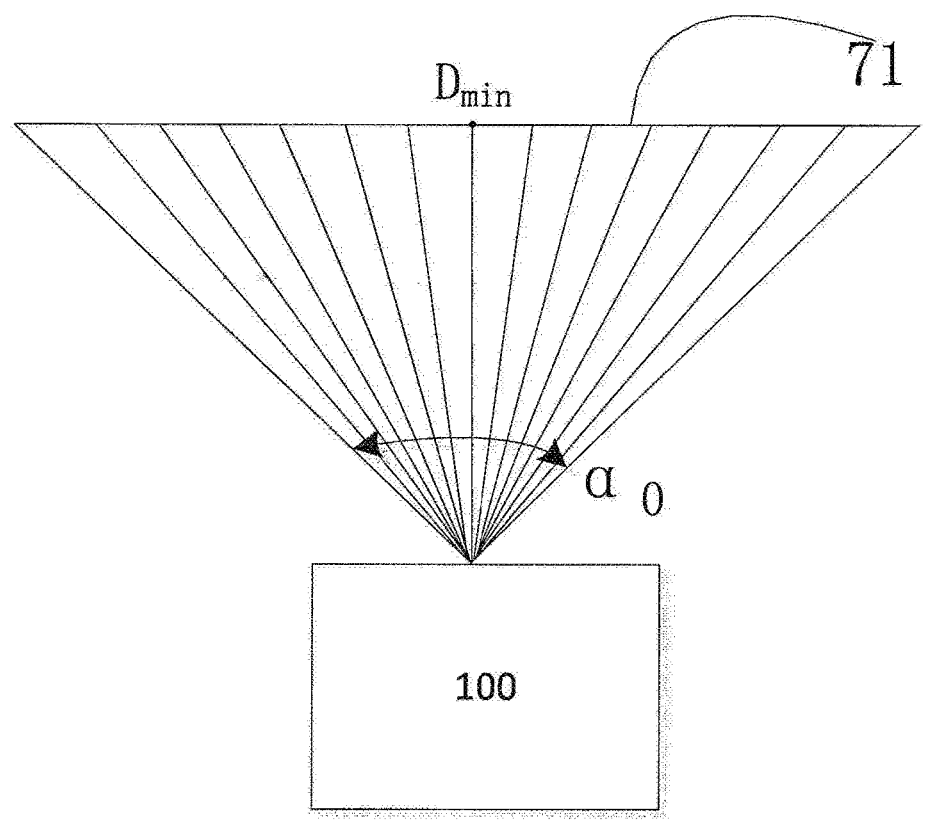
FIG. 4 is a schematic diagram illustratively showing the principle of horizontal zero point calibration.

Both the horizontal laser scanning device 2 and the vertical laser scanning device 3 are mounted at a height H from the ground. When the horizontal zero point position is calibrated, the vertical reflection mirror 32 maintains the initial vertical scanning angle $\beta_0$ unchanged, and the horizontal scanning stepper motor 21 drives the horizontal reflection mirror 22 to horizontally scan a front calibration area on the ground with a scanning angle of $\alpha_0$. The calibration area is usually in front of and below the horizontal laser scanning device 2, for example, the stopping line 71 as shown in FIG. 1. During the horizontal scanning process, the laser ranging device 1 obtains the distance values of individual points in the calibration area in real time. FIG. 4 is a schematic diagram illustratively showing the principle of the horizontal zero point calibration.

Then, the information process unit 5 equally divides the calibration area into N small regions, and performs distance measurement on the boundary points of each of the small regions to obtain N+1 distance values $D_n$, where n=0, 1, . . . , N.

A minimum value $D_{min}$ is found among the N+1 distance values $D_n$. With the boundary point corresponding to the minimum value $D_{min}$ as a center, an extended area $D_{exe}$ is determined. For example, with the boundary point corresponding to the minimum value $D_{min}$ as the center, by shifting a preset length or degree leftwards and rightwards, the extended area can be obtained. The purpose for determining the extended area is to determine an approximate range where the horizontal zero point might exist.

The extended area is scanned again. At this time, the extended area can be divided more finely with the highest resolution, and distance measurement can be performed with respect to the divided boundary points, and a position of the horizontal reflection mirror corresponding to a minimum distance value can be identified as a horizontal zero point.

Vertical Zero Point Calibration

The calibration of the vertical zero point can be realized by scanning for two times.

First, the horizontal laser scanning device 2 maintains static at a zero angle, and the vertical laser scanning device 3 conducts distance measurement at a vertical scanning angle $\beta_1$ to obtain first distance value $L_1$.

Then, the horizontal laser scanning device 2 still maintains static, and the vertical laser scanning device 3 conducts the distance measurement again by adjusting the vertical scanning angle upwards by an angle $\lambda$, i.e., at a vertical scanning angle $\beta_2$, to obtain a second distance value $L_2$. The angles $\beta_1$ and $\beta_2$ are all angles of laser with respect to the horizontal line.

Figure 5:
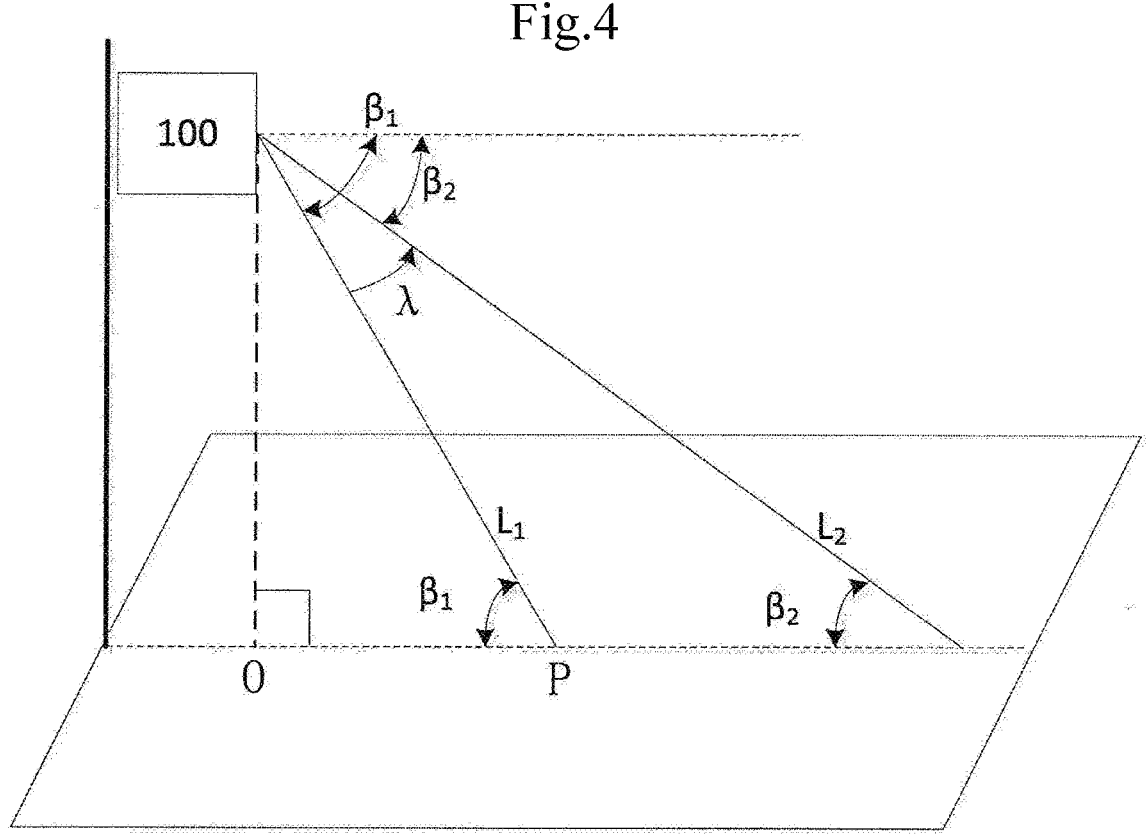
FIG. 5 is a schematic diagram illustratively showing the principle of vertical zero point calibration.

FIG. 5 is a schematic diagram illustratively showing the principle of the vertical zero point calibration. In FIG. 5, the right-angled triangle with $L_1$ as its hypotenuse, and the right-angled triangle with $L_2$ as its hypotenuse share the same side, which indicates the height value of the laser scanning system from the horizontal ground.

Further, $\beta_2 = \beta_1 - \lambda$, and according to the measured $L_1$ and $L_2$ and the known $\lambda$, and further in view of the equation $L_1 * \sin \beta_1 = L_2 * \sin(\beta_1 - \lambda)$, $\beta_1$ can be calculated.

In this way, a position of the vertical reflection mirror when the vertical reflection mirror is rotated upwards by an angle $(\beta_1 - \lambda)$ with respect to the current position of the vertical reflection mirror can be identified as a vertical zero point.

Then, the horizontal and vertical zero points are calibrated, and the zero point calibration is finished.

The above described is the calibration performed when the laser scanning-based aircraft docking guidance system 100 is mounted for the first time. Every time when the laser scanning system is repowered on, a zero correction step needs to be performed.

After the system is powered on again, both the horizontal scanning stepper motor 21 and the vertical canning stepper motor 31 may generate dithering (or vibrations). In order to minimize error caused by the dithering and increase the accuracy of the guidance system, a reference object needs to be selected to re-calibrate the zero point for laser scanning.

For example, the boundary of the laser emitting window 12 may be selected as the reference object. After the device mounting zero point calibration step is finished, the laser scanning system adjusts a scanning angle from a calibrated zero point step by step until a preset reference object is found, and records a scanning angle $(\alpha_r, \beta_r)$ at this time as a correction angle.

Specifically, the horizontal scanning stepper motor 21 and the vertical scanning stepper motor 31 starts from the calibrated zero point. Taking a predetermined corner (for example, the upper left corner) of the laser emitting window 12 as an example, the vertical reflection mirror gradually goes upwards from the initial angle, and horizontal scanning is performed for each vertical scanning angle, until a distance value consistent with a preset length is obtained at a certain vertical scanning angle, and the horizontal scanning angle at that time corresponds to the position where the upper left corner of the laser emitting window 12 is, i.e., the direction of the horizontal scanning angle is towards left. The vertical scanning angle $\beta_r$ and the horizontal scanning angle $\alpha_r$ are recorded as the correction angle, and the correction angle can be hardened into a constant for recording.

When the laser scanning system is restarted, the horizontal scanning stepper motor 21 and the vertical scanning stepper motor 31 scan randomly until the preset reference object is found. Then, the scanning angles are adjusted backwards by the correction angle to find the calibrated zero point, so that subsequent capture, tracking and guidance procedure can have higher accuracy.

When the laser scanning-based aircraft docking guidance system 100 is mounted for the first time, a guidance line setting step may also be performed. Specific steps may be as follows.

A calibration object is set up at two positions on the guidance line. The calibration object may be a person or a calibration board which is bigger than a person. One of the two positions is an intersection point (i.e., a stopping point) of the guidance line and a stopping line, and the other is a father position on the straight guidance line, which can be as far as possible, for example, 100 meters away. The calibration objects at the two positions are horizontally scanned for many times, and the points obtained by the scanning are converted into x-y-z three dimensional coordinates. Points, z coordinates of which are within a certain range, are extracted as the points obtained by the scanning of the calibration objects. The range is preferably from 0.5 meter to 1.5 meters. For the two positions, average coordinates of points obtained by scanning of the calibration objects are calculated so as to obtain the x-y coordinates of the two positions. A straight line passing the two positions is constructed to obtain an equation of the guidance line $y = k_g x + b_g$. Another straight line perpendicular to the guidance line and passing through the first position (i.e., the stopping point position) is constructed to obtain an equation of the stopping line $y=k_sx+b_s$. For the guidance lines corresponding to the stopping lines, different values of $b_s$ are set and the equation is recorded so that a plurality of stopping point positions and stopping line equations can be obtained.

When the guidance line happens to be perpendicular with the system, the guidance line equation can be recorded as $x=b_g$, and the stopping line is recorded as $y=b_s$.

After the above mentioned calibration and correction procedures, the laser scanning-based aircraft docking guidance system 100 starts to perform a capture step. The laser scanning-based aircraft docking guidance method in the present disclosure may generally include three steps: a capture step, a guidance step and a tracking step.

In the capture step, laser scanning is conducted to horizontally scan a position where an aircraft head of an aircraft is expected to appear, pieces of echo data based on the laser scanning is obtained, and according to a judgment condition, whether the aircraft appears is determined based on the echo data.

In the guidance step, after the aircraft appears, the laser scanning is conducted to horizontally scan the aircraft head, echo data based on the laser scanning is obtained, and a position of an aircraft nose of the aircraft is determined according to the echo data.

In the tracking step, while the aircraft is traveling, the position of the aircraft nose is tracked by adjusting a vertical scanning angle of the laser scanning, the posture of the aircraft (including distance and deflection direction) is calculated according to the position of the aircraft nose, and is displayed in real time.

Figure 6:
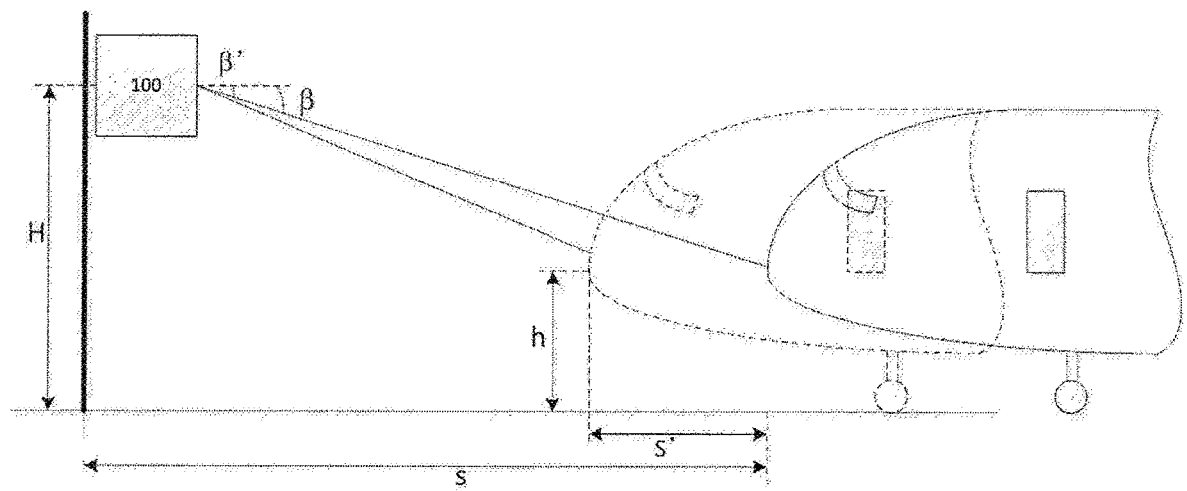
FIG. 6 is a schematic diagram illustratively showing relative positions of a laser scanning-based aircraft docking guidance system and an aircraft.

Specifically, in the capture step, referring to FIG. 6, the aircraft type or a particular aircraft which can be docked at the gate is designated in advance, and then the aircraft nose height h of an aircraft which should be docked can be known in advance. The mounting height of the system 100 is H (i.e., the system 100 is mounted at a height of H), and a distance from the system 100 to the farthest edge of the capture area is s according to the field definition.

In the capture step, the laser scanning system horizontally scans a position where an aircraft head of an aircraft is expected to appear, obtains echo data based on the laser scanning, and according to a judgment condition, determines whether the aircraft appears based on the echo data.

Specifically, the head of an arriving aircraft is expected to appear at the farthest edge s of the capture area at a height h (i.e., the aircraft nose height). The initial scanning angle β (an included angle with respect to the horizontal line) of the vertical laser scanning device 3 in the system 100 may be:

$$\beta = \arctan\frac{H-h}{s}.$$

Figure 7:
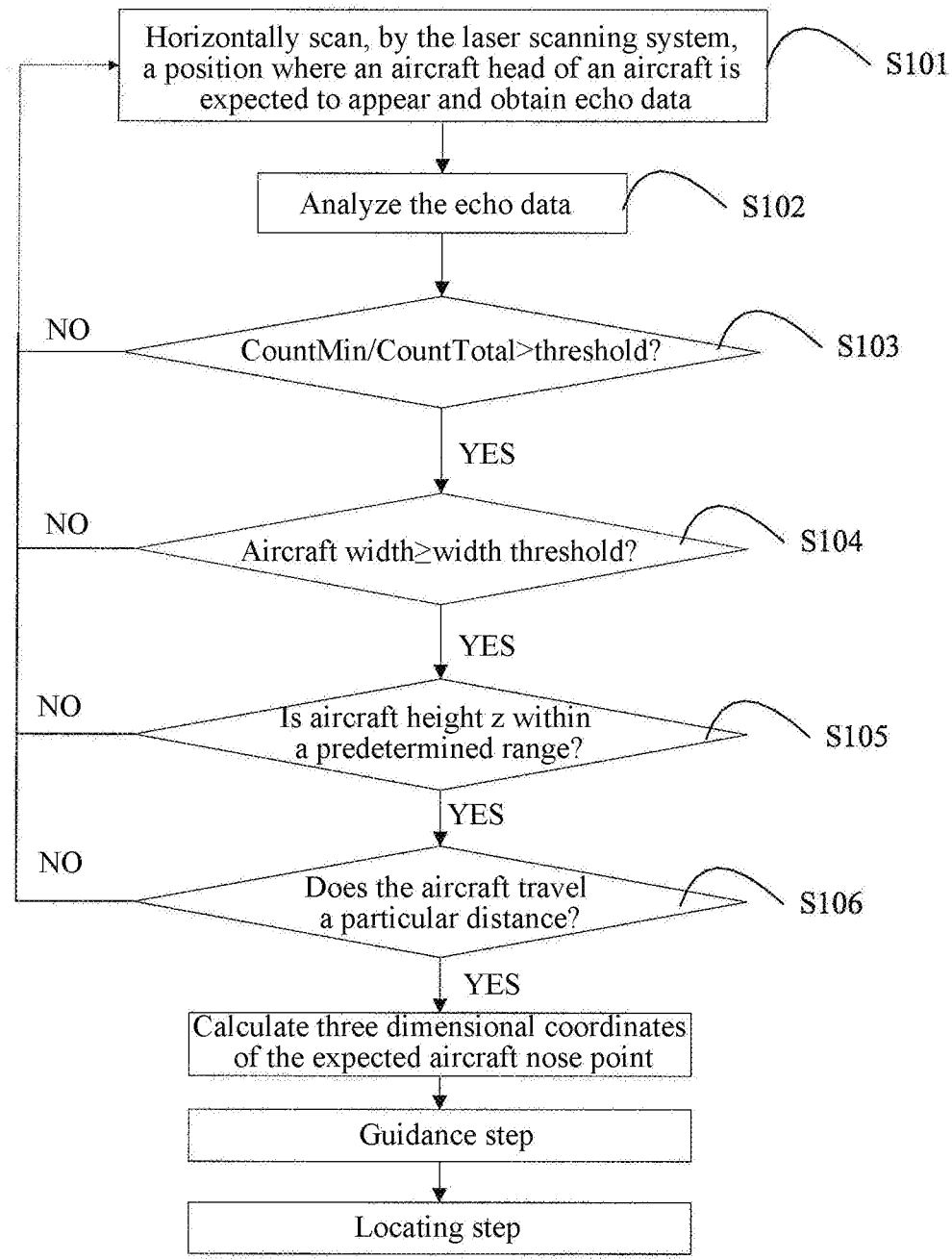
FIGS. 7 and 8 are flow charts illustratively showing a capture step according to the present disclosure.
Figure 8:
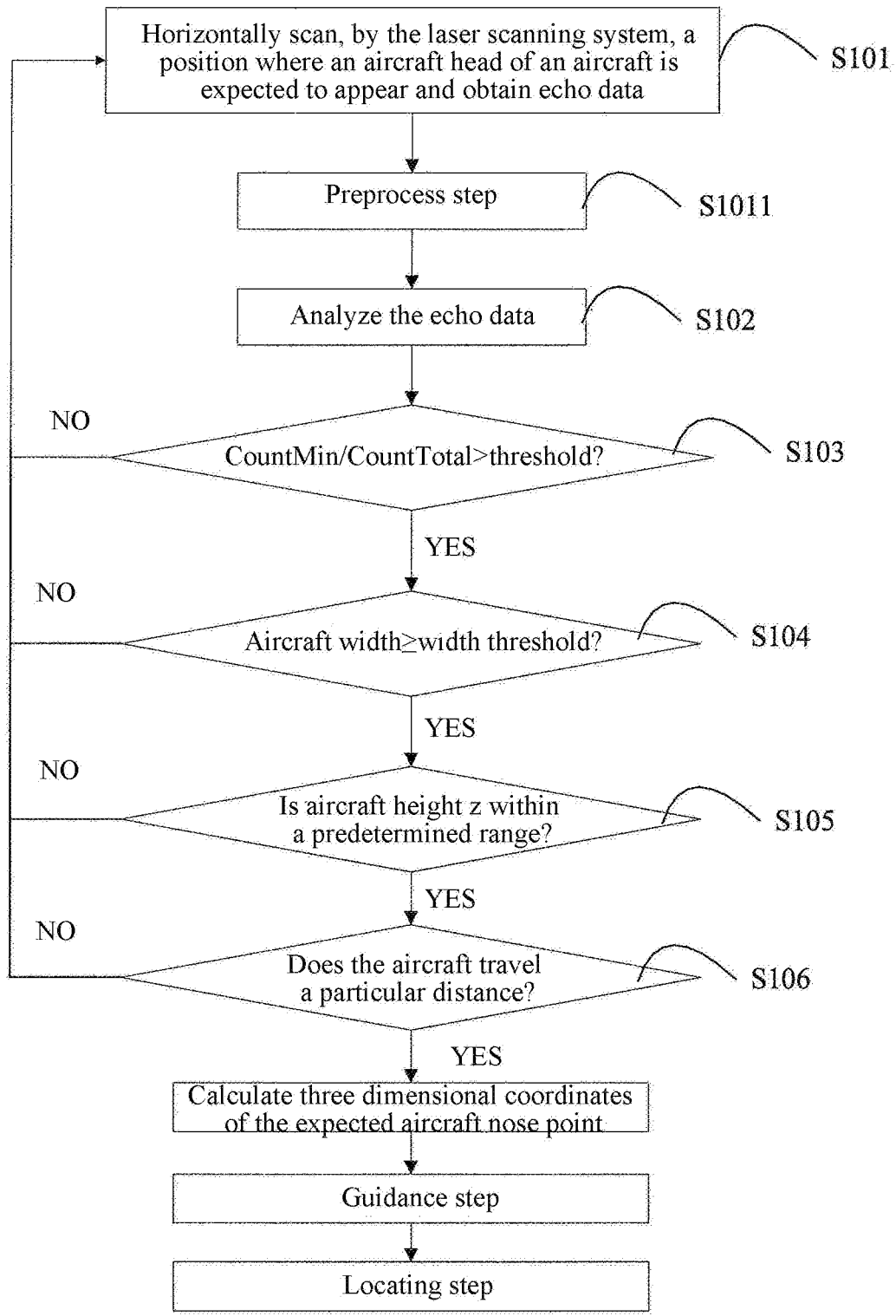

FIG. 7 is a flow chart illustratively showing the capture step in the present disclosure.

In step 101, the laser scanning system horizontally scans a position where an aircraft head of an aircraft is expected to appear and obtains echo data.

The laser scanning system continuously obtains data regarding the same row, especially the distance values of the same row. Before an aircraft appears, the data obtained by the laser scanning system may be wrong returned data which may exceed the farthest distance or may be results far greater than the edge distance. When an aircraft appears, the data dis_predict which the laser scanning system is expected to obtain is:

$$\text{dis\_predict} = \frac{H-h}{\sin\beta}.$$

In step 102, the echo data is analyzed.

The points in the echo data which are within a certain range from dis_predict can be considered as points of interest. For example, the points within the range of dis_predict±5 m can be considered as points of interest.

The total number CountTotal of the points of interest in the data regarding one row obtained after one horizontal scan is calculated.

The data regarding the row may include points of interest and points not of interest. Continuous points of interest in this row are found, and a plurality of strings of points of interest may be found. From the plurality of strings of points of interest, a string having the minimum data $L_{min}$ is identified. The point corresponding to the minimum data can be considered as the expected aircraft nose point. The total number of the points in the string having the minimum data $L_{min}$ is CountMin.

In step 103, whether CountMin/CountTotal is greater than a threshold is determine. If CountMin/CountTotal is greater than a threshold, step 104 is performed. If CountMin/CountTotal is not greater than a threshold, step 101 is performed.

The threshold may be from 0.3 to 0.7, for example, 0.5.

In step 104, an aircraft width is calculated based on the total number of the pieces of echo data, and whether the aircraft width is not less than a width threshold is determined. If the aircraft width is not less than a width threshold, step 105 is performed. If the aircraft width is less than a width threshold, step 101 is performed.

Each gate is assigned with a particular type of aircraft in advance, parameters of the aircraft of this type are known. Under such condition, further determination can be made according to the width of the aircraft which is actually being docked to identify whether the aircraft currently being docked meets the parameter requirements of the predefined type, and then whether the aircraft currently being docked is the particular type of aircraft assigned in advance can be determined.

The aircraft width width_cal of the currently being docked aircraft is calculated:

$$\text{width\_cal} = L_{min}*\sin(\text{CountTotal}*R),$$

where R is the rotation angle of a stepper motor for driving a reflection mirror to be rotated for each measurement.

Whether the aircraft width meets width_cal≥width*Q is determined, where Q is a width judgment parameter, which may be 0.7, for example, width is the aircraft width of the particular type of aircraft. If the aircraft width meets the above condition, step 105 is performed. If the aircraft width does not meet the above condition, step 101 is performed to conduct further scanning.

In step 105, an aircraft height z is calculated and whether the calculated aircraft height is within a predetermined range is determined. If the calculated aircraft height is within a predetermined range, step 106 is performed. If the calculated aircraft height is not within a predetermined range, step 101 is performed.

As with step 104, the height data of the aircraft being docked is further determined in this step so as to accurately identify whether the aircraft currently being docked meets the parameter requirements of the predefined type of aircraft, and then whether the aircraft currently being docked is the particular type of aircraft assigned in advance can be determined.

The aircraft height z is the aircraft nose height. When the laser scanning in step 101 is performed for the first time, the point corresponding to $L_{min}$ in the obtained echo data can be considered as the expected aircraft nose point:

$$z=H-L_{min}*\sin\beta$$

Whether the aircraft height meets h−w≤z≤h+w is determined, where h is the aircraft nose height of the particular type of aircraft which is known, and w is a height threshold parameter, for example, w is equal to 0.5 m.

If the aircraft height meets the above condition, it can be determined that the aircraft currently being docked is the particular type of aircraft, and then step 106 is further performed. If the aircraft height does not meet the above condition, step 101 is performed.

In step 106, whether the aircraft travels a particular distance is determined. If the aircraft does not travel a particular distance, step 101 is performed. If aircraft travels a particular distance, three dimensional coordinates of the expected aircraft nose point of the captured aircraft are calculated and then the subsequent guidance step and tracking step are performed.

For example, the particular distance may be 10 meters. In the present disclosure, from the time when the aircraft enters into the capture area, repeated scanning and determinations are made while the aircraft travels 10 meters. If the aircraft is consistent with the particular aircraft type and travels beyond 10 meters, the three coordinates of the expected aircraft nose point of the aircraft are obtained. After an aircraft travels the particular distance, the aircraft enters the guidance area.

The three dimensional coordinates of the expected aircraft nose point can be calculated according to the point corresponding to $L_{min}$ in the echo data obtained by the laser scanning system, the deflection angles β and α of the vertical and horizontal laser scanning devices corresponding to this point:

$$x=L_{min}*\sin\alpha*\cos\beta$$

$$y=L_{min}*\cos\alpha*\cos\beta$$

$$z=H-L_{min}*\sin\beta.$$

According to another embodiment, another step 1011 (i.e., a preprocess step) may be further included between steps 101 and 102. In the preprocess step, when the echo data is obtained, median filtering is performed on the echo data and then whether the aircraft appears is determined. The preprocess step can be performed any time when echo data is received, and after the echo data is processed, subsequent step can be performed.

The purpose for preprocessing data is to ensure the effectiveness and real time performance of data. The preprocess mainly include removal of random noise points and coordinate conversion of data points.

The one row of data obtained after one scan in step 101 can be defined as a point set P ($d_1, d_2, d_3, \ldots, d_N$), and a forward data difference is defined as $\Delta d = d_j - d_{j-1}$.

For adjacent points on a continuous curved surface, Δd is very small. Due to the existence of noise pints, assuming the value of the noise point is $d_j$, the two differences Δd between one noise point and its two neighboring points $\Delta d_{j-1}$ and $\Delta d_{j+1}$ are relatively big.

Assuming the sequence length s=5, i.e., median sequence points ($d_{j-2}, d_{j-1}, d_j, d_{j+1}, d_{j+2}$) are selected to perform filtering, where $d_j$ is the noise point.

In order to distinguish the noise points and points on different scanning planes, data needs to be rearranged. For any two adjacent laser points ($d_{j-2}, d_{j-1}, d_j, d_{j+1}, d_{j+2}$), if the values of $d_j$ and $d_{j-1}$ meet $|d_j-d_{j-1}| \geq 1$ m, ($d_{j-2}, d_{j-1}, d_j, d_{j+1}, d_{j+2}$) are arranged in an ascending order to obtain a new sequence ($d_{s-2}, d_{s-1}, d_s, d_{s+1}, d_{s+2}$), and $d_j$ is amended as the median value $d_s$ in the new sequence (i.e., $d_j=d_s$). In this way, the sharply change point $d_j$ can be filtered out and the point $d_j$ can be amended as a value which is adjacent to the point $d_j$, and the positions and values of other points in the original sequence keep unchanged.

The main steps of the median filtering include:

(1) successively comparing distance values between adjacent data points: $\Delta d_j = d_j - d_{j-1}$;

(2) determining whether each $\Delta d_j$ is greater than a predetermined threshold (1 m); if one $\Delta d_j$ is greater than the threshold, extracting a neighborhood range ($d_{j-2}, d_{j-1}, d_j, d_{j+1}, d_{j+2}$) of $d_j$;

(3) rearranging the extracted data sequence ($d_{j-2}, d_{j-1}, d_j, d_{j+1}, d_{j+2}$) in an ascending order to obtain a new sequence ($d_{s-2}, d_{s-1}, d_s, d_{s+1}, d_{s+2}$), replacing $d_j$ with the median point $d_s$, and keeping positions and values of other points in the original sequence unchanged.

In order to guarantee the stability of the median filtering, at the beginning of the iteration, the first two values can be set as equal to each other and can be assigned a value of zero ($d_0=d_1=0$) during the initialization stage so as to arrive at a relatively stable median filtering iteration.

Figure 9:
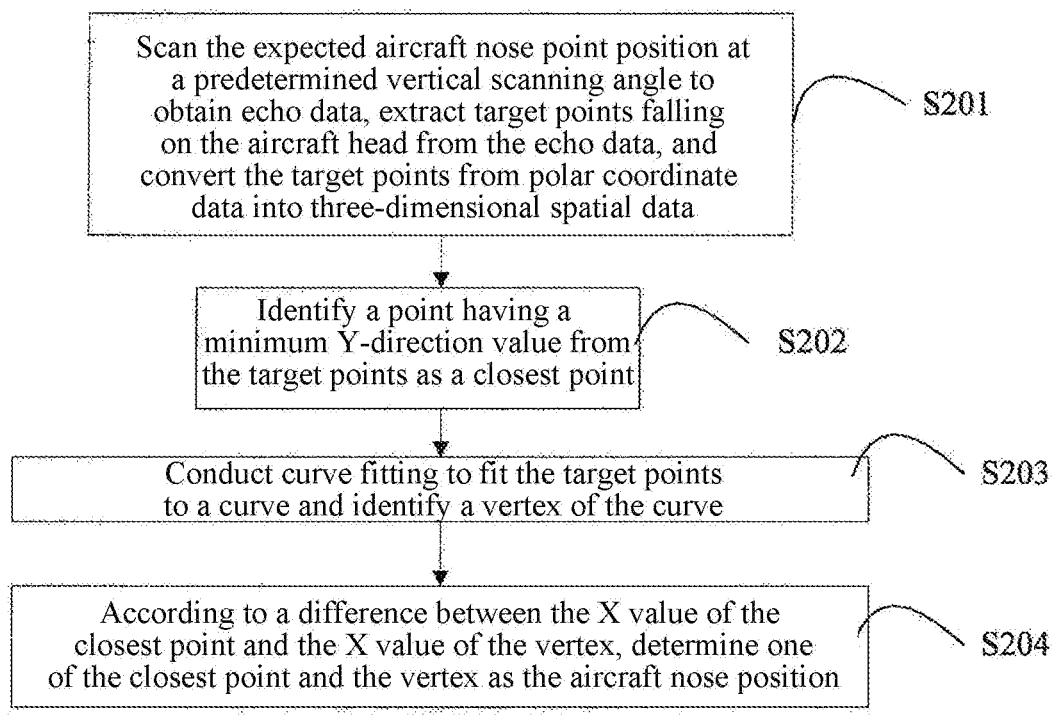
FIG. 9 is a flow chart illustratively showing a guidance step.

After step 106, the guidance step is further performed. FIG. 9 is a flow chart illustratively showing the guidance step. The guidance step can include the following steps.

In step 201, after an aircraft enters into the guidance area, the expected aircraft nose point position is scanned at a predetermined vertical scanning angle to obtain echo data, target points falling on the aircraft head are extracted from the echo data, and the target points are converted from polar coordinate data into three-dimensional spatial data.

The target points can be selected based on the same principles for selecting the points of interest as mentioned above.

In step 202, a point having a minimum Y-direction value is identified from the target points as a closest point ($X_d, Y_d$).

In step 203, curve fitting is conducted to fit the target points to a curve and a vertex of the curve is identified.

Assuming that the set of target points falling on the aircraft head is S ($p_1, p_2 \ldots p_i \ldots p_I$), where i is the serial number of each of the target points, and I is the total number of the target points. The X-axis coordinate and Y-axis coordinate of each of the target points Pi are denoted as ($x_i, y_i$). Second-order polynomial fitting is conducted for all the target points:

$$p(x)=a_0+a_1 x+a_2 x^2.$$

According to least square method, the values of $a_0$, $a_1$, and $a_2$ can be obtained.

After the quadratic curve equation is obtained, the vertex ($X_0, Y_0$) of the curve can be identified, and the coordinates of the vertex can be denoted as ($x_{min}, y_{min}$), and this point is the aircraft nose point, wherein:

$$x_{min} = -\frac{a_1}{2a_2} \text{ and } y_{min} = \frac{4a_2a_0 - a_1^2}{4a_2}.$$

Matching of ($x_{min}$,$y_{min}$) against the set S of target points is conducted to identify a point which has X-axis and Y-axis coordinates which are the same as ($x_{min}$,$y_{min}$), and the three dimensional coordinates ($x_n$, $y_n$, $z_n$) of the point can be formed using ($x_{min}$,$y_{min}$) and the Z-axis coordinate of the point.

In step 204, according to a difference between the value of $X_d$ of the closest point ($X_d$, $Y_d$) and the value of $X_{min}$ of the vertex, one of the closest point and the vertex can be determined as the aircraft nose position.

For example, $\Delta X = |X_d - X_{min}|$.

Whether $\Delta X$ is smaller than a preset threshold can be determined. If $\Delta X$ is not smaller than a preset threshold, ($X_0$, $Y_0$) can be taken as the aircraft point. If $\Delta X$ is smaller than a preset threshold, the closest point ($X_d$, $Y_d$) can be taken as the aircraft pose point. In this way, the aircraft nose point can be located accurately. The present threshold can be for example 50 centimeters.

Using the coordinates of the aircraft nose point, according to the equation of the guidance line and the equation of the stopping line, the deviation distance from the aircraft nose point to the guidance line and the remaining distance from the aircraft nose point to the stopping line can be calculated.

In step 205, the aircraft nose position is displayed on the information display unit 6.

Figure 10:
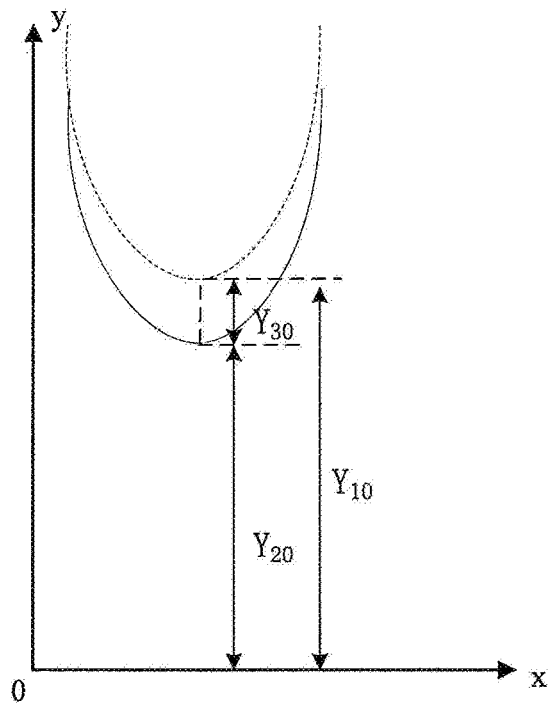
FIG. 10 is an aerial view during tracking of an aircraft.
Figure 11:
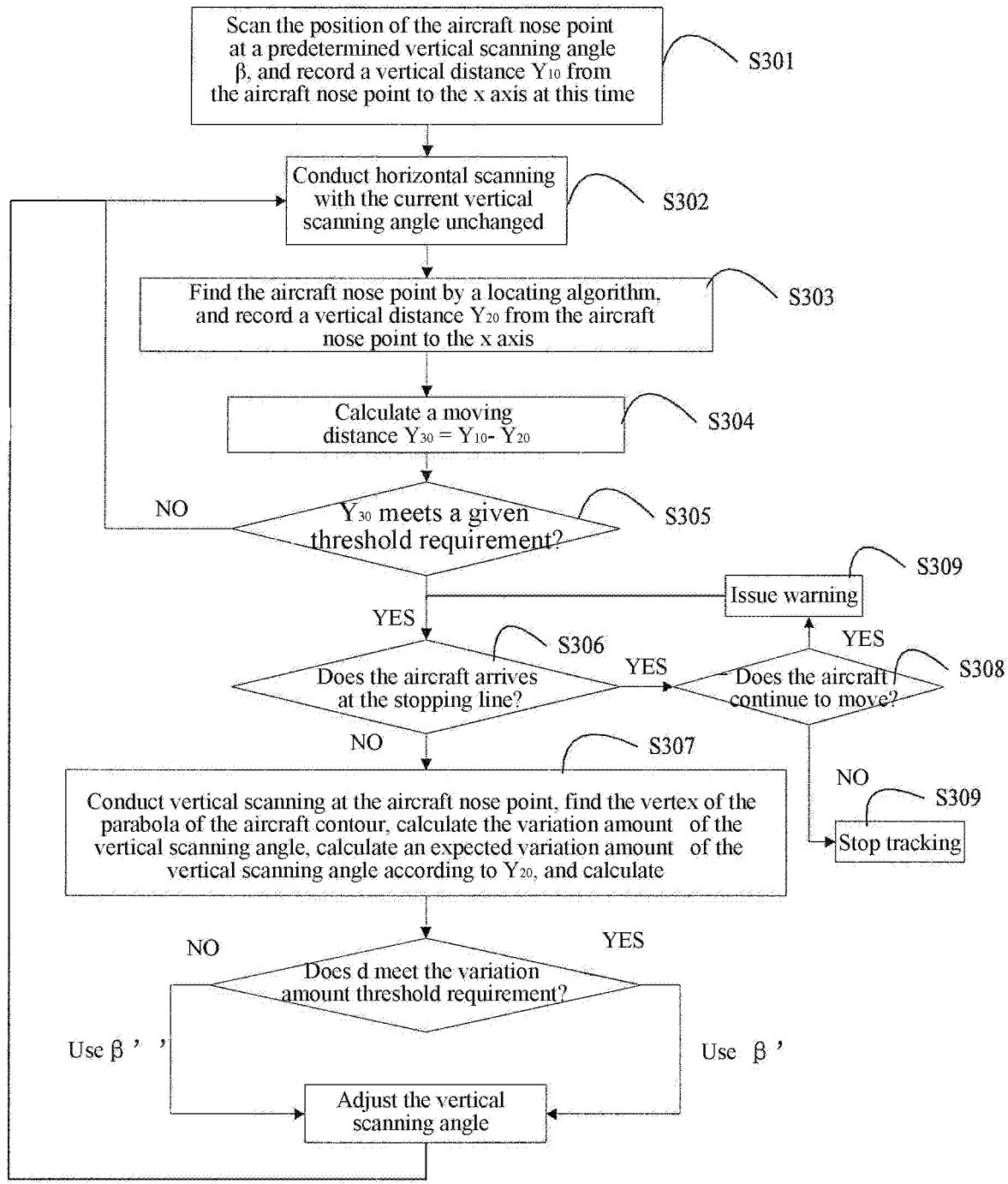
FIG. 11 is a flow chart illustratively showing a tracking step.

After the aircraft nose is located, because the aircraft moves continuously, the laser scanning system needs to update the scanning position in real time according to the position of the aircraft nose to determine the real time position of the aircraft at any time. Thus, after step 204, the tracking step is further performed. FIG. 10 is an aerial view during tracking of an aircraft, and FIG. 11 is a flow chart illustratively showing the tracking step.

The tracking step may include the following steps.

In step 301, the position of the aircraft nose point is scanned at a predetermined vertical scanning angle β, and a vertical distance $Y_{10}$ from the aircraft nose point to the x axis at this time is recorded.

In step 302, as the aircraft travels forward, horizontal scanning is conducted with the current vertical scanning angle unchanged.

In step 303, the current aircraft nose point is found by a locating algorithm, a vertical distance $Y_{20}$ from the aircraft nose point to the x axis is recorded, and the current aircraft nose point is displayed on the information display unit 6 in real time.

The locating algorithm can be as follows. When the horizontal scanning is conducted while maintaining the vertical scanning angle β, the aircraft is travelling forward, and the minimum distance value in the currently received echo data gradually decreases. The shape of the aircraft is fixed and the data about the shape of the aircraft is known, and then according to the received echo data and the known shape data of the particular type of aircraft, the specific position of the scanned aircraft when the horizontal scanning is conducted with the vertical scanning angle β unchanged. And, the position of the current aircraft nose point can be known by calculation according to the shape data of the particular type of aircraft.

In step 304, a moving distance is calculated: $Y_{30} = Y_{10} - Y_{20}$.

In 305, whether $Y_{30}$ meets a given threshold requirement is determined. If $Y_{30}$ meets a given threshold requirement, step 306 is performed. If $Y_{30}$ does not meet a given threshold requirement, step 302 is performed.

When $Y_{10}$ is equal to or greater than 20 meters, the threshold is set as 5 meters. When $Y_{10}$ is smaller than 20 meters, the threshold is set as 1 meter. Whether $Y_{30}$ is smaller than the threshold is determined.

In step 306, whether the aircraft arrives at the stopping line is determined. If the aircraft has arrived at the stopping line, step 307 is performed.

In step 307, vertical scanning is conducted for once at the current aircraft nose point to obtain the contour of the aircraft, find the vertex of the parabola of the aircraft contour, and thereby calculate a variation amount β' of the vertical scanning angle. At the same time, an expected variation amount β" of the vertical scanning angle is calculated according to $Y_{20}$, and d=|β'-β"| is calculated. If d meets a variation amount threshold requirement, the vertical scanning angle is adjusted using β'. If d does not meet the variation amount threshold requirement, the vertical scanning angle is adjusted using β", and step 302 is performed. The threshold may be ranging from 0.3 to 1 degree, for example, 0.5 degree.

The step of the vertical scanning is consistent with step 203, wherein $$\beta'' = \arctan \frac{H-h}{y_{20}} - \beta.$$

In step 308, tracking is continued for a predetermined time period, and whether the aircraft is moving is determined.

In step 309, if the aircraft is moving, warning can be issued, and step 306 is performed. If the aircraft is not moving, the tracking can be stopped.

In view of the above, the technical solutions in the present disclosure can adjust the vertical scanning angle at any time to find the actual position of the aircraft nose point at any time. Thus, tracking and display of the aircraft nose point are realized.

In addition to the above steps, after an aircraft enters the type identification and identity verification area, the technical solutions in the present disclosure may further include an aircraft type identification step. If it is found in the aircraft identification step that the current aircraft is not consistent with the type of the aircrafts which should be docked in at a gate, corresponding verifications conditions are not met, and then warning information can be issued. The aircraft identification may include one or more of aircraft nose height verification, aircraft cabin width verification, verification of a head aerial view profile, verification of a head side view profile and aircraft engine verification.

Depending on different requirements, the above verification conditions can be classified into different levels as follows:

Level 1—verify whether aircraft nose height and aircraft cabin width are right;

Level 2—verifying whether aircraft nose height, aircraft cabin width, and aircraft head aerial view profile are right;

Level 3—verifying whether aircraft nose height, aircraft cabin width, aircraft head aerial view profile and aircraft head side view profile are right;

Level 4—verifying whether aircraft nose height, aircraft cabin width, aircraft head aerial view profile, aircraft head side view profile are right, and whether the number of aircraft engines and the distance between engines are right.

A higher safety level requires a stricter condition to verify whether the aircraft type and identity are right, and accordingly more time is needed. Thus, a corresponding verification level can be selected according to the length of guidance lines of aprons and the aircraft type.

Further, when engines are scanned, the position of the aircraft nose can be calculated according to the obtained positions and the relationship between relative positions of the aircraft nose and engines so as to locate the aircraft.

The aircraft nose height verification can be performed as described above with respect to step 105.

The aircraft cabin width verification can be performed as described above with respect to step 104.

The verification of the head aerial view profile may include: bringing a plurality of pieces of three dimensional echo data $(x_i, y_i, z_i)$ obtained by horizontal laser scanning into a preset aerial view profile equation of aircraft head $y=f^n(x)$, wherein the preset aerial view profile equation of aircraft head corresponds to a cross section passing through the aircraft head and nose and is in parallel with the ground, and the projection of the profile of the cross section on the ground is a curved line; calculating a horizontal fit point error $\Delta d_i^h = |f^n(x_i) - y_i|$, identifying a maximum horizontal fit error $D_H = \max(\Delta d_i^h)$, and assuming $\Delta D_H = 0.3$ m, if $D_H < \Delta D_H$, determining that the verification of the head aerial view profile is passed, wherein $\Delta D_H$ is a threshold for the verification of the head aerial view profile, i is the serial number of individual one of target points in the echo data, and n is the number of fittings of the aerial view profile equation, for example, n equals to 7.

The verification of the head side view profile includes: bringing a plurality of pieces of three dimensional echo data $(x_i, y_i, z_i)$ obtained by vertical laser scanning into a preset side view profile equation of aircraft head $z=g^m(y)$, wherein the preset side view profile equation of aircraft head corresponds to a cross section passing through the aircraft head and nose and is perpendicular to the ground, and the cross section profile is projected on a yoz plane in the coordinate system and high order curve-fitting is conducted with respect to the boundary of the curved line; calculating a vertical fit point error $\Delta d_j^v = |g^m(y_i) - z_i|$, identifying a maximum vertical fit error $D_v = \max(\Delta d_j^v)$, and assuming $\Delta D_V = 0.3$ m, if $D_V < \Delta D_V$, determining that the verification of the head side view profile is passed, wherein $\Delta D_V$ is a threshold for the verification of the head side view profile, i is the serial number of individual one of target points in the echo data, and m is the number of fittings of the side view equation, for example, m equals to 11.

The aircraft engine verification may be as follows.

In step 41, positions of engines are calculated according to the position of the aircraft nose, and laser scanning is conducted to horizontally and vertically scan the positions of the engines.

Because the type of the aircrafts which should be docked at one gate is determined, the relationship between relative positions of the aircraft nose and each of the engine is determined, and thus positions of each engine can be calculated according to the position of the aircraft nose.

For example, if the coordinate differences between the aircraft nose and an engine center is $(\Delta x_n, \Delta y_n, \Delta z_n)$ are known, and the obtained coordinates of the aircraft nose are $(x_n, y_n, z_n)$, the coordinates of a theoretic engine center are $P_{egn}(x_n + \Delta x_n, y_n + \Delta y_n, z_n + \Delta z_n)$. By adjusting the deflection angle of the vertical reflection mirror 32 which reflects laser to make the laser can scan the theoretic engine center, horizontal scanning is conducted.

In step 42, the echo data obtained by the horizontal laser scanning is converted into x-y-z three dimensional coordinates, a closest coordinate point which is closest to the theoretic engine center is found, and points contiguous to the closest coordinate point are found to obtain a point set, and a distance between a leftmost point and a rightmost point in the point set is calculated as an engine width and a middle point between the leftmost point and the rightmost point is taken as a horizontal coordinate $x_{egn}$ of an engine center.

The term "contiguous" requires that the distance between adjacent points does not exceed 20 cm.

In step 43, the echo data obtained by the vertical laser scanning is converted into x-y-z three dimensional coordinates, a closest coordinate point which is closest to the theoretic engine center is found, and points contiguous to the closest coordinate point are found to obtain a point set, and a distance between a uppermost point and a lowermost point in the point set is calculated as an engine height, and a middle point between the uppermost point and the lowermost point is taken as a height $z_{egb}$ of the engine center from ground.

In step 44, if a pair of $x_{egn}$ and $z_{egb}$ can be found, it can be determined that an engine is found. By scanning different engines for a plurality of times, the number $n_{egn}$ of engines can be obtained.

In step 45, whether the number of the engines is consistent with a preset number is determined, and if the number of the engines is not consistent with the preset number, it can be determined that the aircraft engine verification is not passed.

In step 46, whether a difference between the horizontal coordinate of the engine center and a standard value exceeds a threshold or whether a difference between the height of the engine center from ground and a standard value exceeds a threshold (for example, 30 cm) is determined, and if the difference between the horizontal coordinate of the engine center and a standard value exceeds the threshold or the difference between the height of the engine center from ground and a standard value exceeds the threshold, it can be determined that the aircraft engine verification is not passed.

In step 47, whether a difference between the engine width and a standard value exceeds a threshold, or whether a difference between the engine height and a standard value exceeds a threshold (for example, 20 cm), and if the difference between the engine width and a standard value exceeds the threshold, or the difference between the engine height and a standard value exceeds the threshold, it can be determined that the aircraft engine verification is not passed.

The technical solutions provided by embodiments of the present disclosure can capture, guide and track the aircrafts, obtain real time positions of aircrafts by accuracy laser scanning and display the positions so as to provide docking guidance to pilots. Further, technical solutions of the present disclosure can automatically identify types of aircrafts and thereby increase safety for aircraft docking.

What is claimed is:

1. A laser scanning-based aircraft docking guidance method, comprising:
   in a capture step, conducting laser scanning to horizontally scan a position where an aircraft head of an aircraft is expected to appear, obtaining pieces of echo data based on the laser scanning, and according to a judgment condition, determining whether the aircraft appears based on the echo data;
   in a locating step, after the aircraft appears, conducting the laser scanning to horizontally scan the aircraft head, obtaining the echo data based on the laser scanning, and determining a position of an aircraft nose of the aircraft according to the echo data; and in a tracking and guidance step, while the aircraft is traveling, tracking the position of the aircraft nose by adjusting a vertical scanning angle of the laser scanning, and displaying the position of the aircraft nose in real time, wherein prior to the capture step, the method further comprises a zero point calibration step which comprises a device mounting zero point calibration step performed when a laser scanning system is first installed, wherein the device mounting zero point calibration step comprises:

a horizontal zero point measurement step which comprises:

horizontally scanning, by the laser scanning system, a calibration area on the ground with a vertical scanning angle fixed, wherein the calibration area is divided equally into N small regions; measuring distances from a boundary point of each of the small regions, and finding a minimum value among the obtained distance values; determining an extended area with a boundary point corresponding to the minimum value as a center; and identifying a position of a horizontal reflection mirror corresponding to a minimum distance value as a horizontal zero point; and a vertical zero point measurement step which comprises:

conducting distance measurement at a vertical scanning angle $\beta_1$ by the laser scanning system to obtain a first distance value $L_1$, conducting the distance measurement again by adjusting the vertical scanning angle $\beta_1$ upwards by an angle $\lambda$ to obtain a second distance value $L_2$, and calculating $\beta_1$ using the following equation:

$$L_1 * \sin \beta_1 = L_2 * \sin(\beta_1 - \lambda)$$

wherein a position of a vertical reflection mirror when the vertical reflection mirror is rotated upwards by an angle $(\beta_1 - \lambda)$ with respect to a current position of the vertical reflection mirror is identified as a vertical zero point.

2. The method according to claim 1, wherein the zero point calibration step further comprises a zero point correction step which comprises:

after the device mounting zero point calibration step is finished, adjusting a scanning angle of the laser scanning system from a zero point step by step until a preset reference object is found, and recording a scanning angle at this time as a correction angle; and when the laser scanning system is restarted, adjusting the scanning angle backwards by the correction angle to find the zero point after the preset reference object is found by the laser scanning system.

3. The method according to claim 1, wherein the judgment condition further comprises:

A: determining whether a ratio of the number of points of interest, which are continuous and one of which corresponds to a minimum distance value, to the total number of the pieces of echo data is greater than a threshold;

B: calculating an aircraft width based on the total number of the echo data, and determining whether the aircraft width is not less than a width threshold; and C: calculating an aircraft height and determining whether the calculated aircraft height is within a predetermined range;

wherein the distance values of the points of interest are within a specified prediction range.

4. The method according to claim 1, wherein in the capture step, when the echo data is obtained, median filtering is performed on the echo data and then whether the aircraft appears is determined.

5. The method according to claim 1, wherein the locating step further comprises:

extracting from the echo data target points falling on the aircraft head, and converting the target points from polar coordinate data into three-dimensional spatial data;

identifying from the target points a point having a minimum Y-direction value as a closest point;

conducting curve fitting to fit the target points to a curve and identify a vertex of the curve; and determining one of the closest point and the vertex as the position of the aircraft nose according to a difference between an X-value of the closest point and an X-value of the vertex.

6. The method according to claim 1, wherein the tracking and guidance step further comprises:

scanning the position of the aircraft nose at a predetermined vertical scanning angle while the aircraft is travelling;

calculating a current aircraft nose point according to the echo data; and vertically scanning the current aircraft nose point, and calculating a variation amount of the vertical scanning angle according to a vertex of a obtained parabola according to the scanning, and changing the vertical scanning angle according to the variation amount, or calculating the variation amount of the vertical scanning angle according to the current aircraft nose point and changing the vertical scanning angle according to the variation amount.

7. The method according to claim 1, further comprising an aircraft type identification step;

wherein the aircraft type identification step comprises one or more of aircraft nose height verification, aircraft cabin width verification, verification of a head aerial view profile, verification of a head side view profile and aircraft engine verification;

the aircraft nose height verification comprises: if a difference between the aircraft nose height and a preset aircraft nose height is within a preset range, determining that the aircraft nose height verification is passed;

the aircraft cabin width verification comprises: finding two points from the echo data, a difference between X coordinates of which is the maximum, with a straight line distance between the two points as an aircraft cabin width, if the aircraft cabin width is greater than a product of a theoretic aircraft cabin width and a width coefficient, determining that the aircraft cabin width verification is passed;

the verification of the head aerial view profile comprises: bringing the echo data $(x_i, y_i, z_i)$ obtained by horizontal laser scanning into a preset aerial view profile equation $y = f''(x)$, calculating a horizontal fit point error $\Delta d_i^h = ..f''(x_i) - y_i|$, identifying a maximum horizontal fit error $D_H = \max(\Delta d_i^h)$, and if $D_H < \Delta D_H$, determining that the verification of the head aerial view profile is passed, wherein $\Delta D_H$ is a threshold for the verification of the head aerial view profile, i is the serial number of individual one of target points in the echo data, and n is the number of fittings of the aerial view profile equation;

the verification of the head side view profile comprises: bringing the echo data $(x_i,y_i,z_i)$ obtained by vertical laser scanning into a preset side view profile equation $z=g^m(y)$, calculating a vertical fit point error $\Delta d_j^v=|g^m(y_i)-z_i|$, identifying a maximum vertical fit error $D_v=\max(\Delta d_j^v)$, and if $D_v<\Delta D_V$, determining that the verification of the head side view profile is passed, wherein $\Delta D_V$ is a threshold for the verification of the head side view profile, i is the serial number of individual one of target points in the echo data, and m is the number of fittings of the side view profile equation;

the aircraft engine verification comprises:

calculating positions of engines according to the position of the aircraft nose, and conducting laser scanning to horizontally and vertically scan the positions of the engines;

converting the echo data obtained by the horizontal scanning into x-y-z three dimensional coordinates, finding a closest coordinate point which is closest to a theoretic engine center, and finding points contiguous to the closest coordinate point to obtain a point set, and calculating a distance between a leftmost point and a rightmost point in the point set as an engine width and a middle point between the leftmost point and the rightmost point as a horizontal coordinate of an engine center;

converting the echo data obtained by the vertical scanning into x-y-z three dimensional coordinates, finding a closest coordinate point which is closest to the theoretic engine center, and finding points contiguous to the closest coordinate point to obtain a point set, and calculating a distance between a uppermost point and a lowermost point in the point set as an engine height, and a middle point between the uppermost point and the lowermost point as a height of the engine center from ground;

determining whether the number of the engines is consistent with a preset number, and if the number of the engines is not consistent with the preset number, determining that the aircraft engine verification is not passed;

determining whether a difference between the horizontal coordinate of the engine center and a standard value exceeds a threshold or whether a difference between the height of the engine center from ground and a standard value exceeds a threshold, and if the difference between the horizontal coordinate of the engine center and a standard value exceeds a threshold or the difference between the height of the engine center from ground and a standard value exceeds a threshold, determining that the aircraft engine verification is not passed;

determining whether a difference between the engine width and a standard value exceeds a threshold, or whether a difference between the engine height and a standard value exceeds a threshold, and if the difference between the engine width and a standard value exceeds a threshold, or the difference between the engine height and a standard value exceeds a threshold, determining that the aircraft engine verification is not passed.

8. A laser scanning-based aircraft docking guidance system, comprising:

a laser scanning system configured to conduct laser scanning to horizontally scan a position where an aircraft head of an aircraft is expected to appear, obtain echo data based on the laser scanning, an information process unit configured to, according to a judgment condition, determine whether the aircraft appears based on the echo data;

wherein the laser scanning system is further configured to, after the aircraft appears, conduct the laser scanning to horizontally scan the aircraft head and obtain the echo data based on the laser scanning, wherein the information process unit is further configured to determine a position of an aircraft nose of the aircraft according to the echo data;

wherein the laser scanning system is configured to, while the aircraft is traveling, track the position of the aircraft nose by adjusting a vertical scanning angle of the laser scanning system, and an information display unit configured to display the position of the aircraft nose in real time, wherein the laser scanning system is further configured to:
horizontally scan a calibration area on the ground with a vertical scanning angle fixed, wherein the calibration area is divided equally into N small regions; measure distances from a boundary point of each of the small regions, and find a minimum value among the obtained distance values; determine an extended area with a boundary point corresponding to the minimum value as a center; and identify a position of a horizontal reflection mirror corresponding to a minimum distance value as a horizontal zero point; and conduct distance measurement at a vertical scanning angle $\beta_1$ by the laser scanning system to obtain a first distance value $L_1$, conduct the distance measurement again by adjusting the vertical scanning angle $\beta_1$ upwards by an angle $\lambda$ to obtain a second distance value $L_2$, and calculate $\beta_1$ using the following equation:

$$L_1*\sin \beta_1=L_2*\sin(\beta_1-\lambda)$$

wherein a position of a vertical reflection mirror when the vertical reflection mirror is rotated upwards by an angle $(\beta_1-\lambda)$ with respect to a current position of the vertical reflection mirror is identified as a vertical zero point.

9. The system according to claim 8, wherein the laser scanning system is further configured to:

adjust a scanning angle of the laser scanning system from a zero point step by step until a preset reference object is found, and record a scanning angle at this time as a correction angle; and when the laser scanning system is restarted, adjust the scanning angle backwards by the correction angle to find a zero point after the preset reference object is found by the laser scanning system.

10. The system according to claim 8, wherein the judgment condition further comprises:

A: determining whether a ratio of the number of points of interest, which are continuous and one of which corresponds to a minimum distance value, to the total number of the echo data is greater than a threshold;

B: calculating an aircraft width based on the total number of the echo data, and determining whether the aircraft width is not less than a width threshold; and C: calculating an aircraft height and determining whether the calculated aircraft height is within a predetermined range;

wherein the distance values of the points of interest are within a specified prediction range.

11. The system according to claim 8, wherein the information process unit is further configured to, when the echo data is obtained, perform median filtering on the echo data and then determine whether the aircraft appears.

12. The system according to claim 8, wherein the information process unit is further configured to:
extract from the echo data target points falling on the aircraft head, and convert the target points from polar coordinate data into three-dimensional spatial data;
identify from the target points a point having a minimum Y-direction value as a closest point;
conduct curve fitting to fit the target points to a curve and identify a vertex of the curve; and
determine one of the closest point and the vertex as the position of the aircraft nose according to a difference between an X-value of the closest point and an X-value of the vertex.

13. The system according to claim 8, wherein:
the laser scanning system is further configured to scan the position of the aircraft nose at a predetermined vertical scanning angle while the aircraft is travelling;
the information process unit is further configured to:
calculate a current aircraft nose point according to the echo data; and
calculate a variation amount of the vertical scanning angle during vertical scanning of the current aircraft nose point according to a vertex of a obtained parabola according to the scanning, and change the vertical scanning angle according to the variation amount, or calculate a variation amount of the vertical scanning angle according to the current aircraft nose point and change the vertical scanning angle according to the variation amount.

14. The system according to claim 8,
wherein the information process unit is further configured to perform one or more of aircraft nose height verification, aircraft cabin width verification, head aerial view profile verification, head side view profile verification and aircraft engine verification;
the aircraft nose height verification comprises: if a difference between the aircraft nose height and a preset aircraft nose height is within a preset range, determining that the aircraft nose height verification is passed;
the aircraft cabin width verification comprises: finding two points from the echo data, a difference between X coordinates of which is the maximum, with a straight line distance between the two points as an aircraft cabin width, if the aircraft cabin width is greater than a product of a theoretic aircraft cabin width and a width coefficient, determining that the aircraft cabin width verification is passed;
the head aerial view profile verification comprises: bringing the echo data $(x_i, y_i, z_i)$ obtained by horizontal laser scanning into a preset aerial view profile equation $y=f^n(x)$, calculating a horizontal fit point error $\Delta d_i^h = |f^n(x_i) - y_i|$, identifying a maximum horizontal fit error $D_H = \max(\Delta d_i^h)$, and if $D_H < \Delta D_H$, determining that the verification of the head aerial view profile is passed, wherein $\Delta D_H$ is a threshold for the verification of the head aerial view profile, i is the serial number of individual one of target points in the echo data, and n is the number of fittings of the aerial view profile equation;
the head side view profile verification comprises: bringing the echo data $(x_i, y_i, z_i)$ obtained by vertical laser scanning into a preset side view profile equation $z=g^m(y)$, calculating a vertical fit point error $\Delta d_j^v = |g^m(y_i) - z_i|$, identifying a maximum vertical fit error $D_V = \max(\Delta d_j^v)$, and if $D_V < \Delta D_V$, determining that the verification of the head side view profile is passed, wherein $\Delta D_V$ is a threshold for the verification of the head side view profile, i is the serial number of individual one of target points in the echo data, and m is the number of fittings of the side view profile equation;
the aircraft engine verification comprises:
calculating positions of engines according to the position of the aircraft nose;
converting the echo data obtained by the horizontal scanning of the positions of the engines into x-y-z three dimensional coordinates, finding a closest coordinate point which is closest to a theoretic engine center, and finding points contiguous to the closest coordinate point to obtain a point set, and calculating a distance between a leftmost point and a rightmost point in the point set as an engine width and a middle point between the leftmost point and the rightmost point as a horizontal coordinate of an engine center;
converting the echo data obtained by the vertical scanning of the positions of the engines into x-y-z three dimensional coordinates, finding a closest coordinate point which is closest to the theoretic engine center, and finding points contiguous to the closest coordinate point to obtain a point set, and calculating a distance between a uppermost point and a lowermost point in the point set as an engine height, and a middle point between the uppermost point and the lowermost point as a height of the engine center from ground;
determining whether the number of the engines is consistent with a preset number, and if the number of the engines is not consistent with the preset number, determining that the aircraft engine verification is not passed;
determining whether a difference between the horizontal coordinate of the engine center and a standard value exceeds a threshold or whether a difference between the height of the engine center from ground and a standard value exceeds a threshold, and if the difference between the horizontal coordinate of the engine center and a standard value exceeds a threshold or the difference between the height of the engine center from ground and a standard value exceeds a threshold, determining that the aircraft engine verification is not passed;
determining whether a difference between the engine width and a standard value exceeds a threshold, or whether a difference between the engine height and a standard value exceeds a threshold, and if the difference between the engine width and a standard value exceeds a threshold, or the difference between the engine height and a standard value exceeds a threshold, determining that the aircraft engine verification is not passed.

* * * * *